US012573773B2

(12) United States Patent
Kropiewnicki et al.

(10) Patent No.: US 12,573,773 B2
(45) Date of Patent: Mar. 10, 2026

(54) CLAMPING SPRING-TYPE CONTACT DEVICE HAVING AN OVERSTRETCH PREVENTION MECHANISM, AND PLUG CONNECTOR INSERT HAVING AT LEAST ONE SUCH CLAMPING SPRING-TYPE CONTACT DEVICE

(71) Applicant: HARTING Electric Stiftung & Co. KG, Espelkamp (DE)

(72) Inventors: Norbert Kropiewnicki, Bielefeld (DE); Daniel Wesseler, Georgsmarienhütte (DE)

(73) Assignee: HARTING Electric Stiftung & Co. KG, Espelkamp (DE)

(*) Notice: Subject to any disclaimer, the term of this patent is extended or adjusted under 35 U.S.C. 154(b) by 305 days.

(21) Appl. No.: 18/282,524

(22) PCT Filed: Mar. 28, 2022

(86) PCT No.: PCT/DE2022/100233
§ 371 (c)(1),
(2) Date: Sep. 16, 2023

(87) PCT Pub. No.: WO2022/218466
PCT Pub. Date: Oct. 20, 2022

(65) Prior Publication Data

US 2024/0145945 A1 May 2, 2024

(30) Foreign Application Priority Data

Apr. 16, 2021 (DE) ..................... 10 2021 109 565.4

(51) Int. Cl.
*H01R 4/48* (2006.01)

(52) U.S. Cl.
CPC ......... *H01R 4/4828* (2023.08); *H01R 4/4833* (2023.08); *H01R 4/4846* (2023.08); *H01R 4/4821* (2023.08)

(58) Field of Classification Search
CPC .. H01R 4/4828; H01R 4/4833; H01R 4/4821; H01R 11/05
See application file for complete search history.

(56) References Cited

U.S. PATENT DOCUMENTS 6,851,967 B2 * 2/2005 Miyoshi ............... H01R 4/4833 439/441
8,251,738 B2 8/2012 Heckert et al.
10,297,930 B2 5/2019 Wu et al.
(Continued)

FOREIGN PATENT DOCUMENTS

DE 20205821 U1 8/2003
DE 102005028063 10/2006
(Continued)

OTHER PUBLICATIONS

Kropiewnicki et al., "Contact spring arrangement with release member", co-pending U.S. Appl. No. 18/282,521, which is a national phase of PCT/DE2022/100234.

*Primary Examiner* — Vanessa Girardi
(74) *Attorney, Agent, or Firm* — Smartpat PLC

(57) ABSTRACT

Disclosed is an overstretch prevention mechanism for a clamping spring (3) of a clamping spring-type contact device, the overstretch prevention mechanism consisting of a stop (21, 11) of an actuator (2) on a bus bar (1).

11 Claims, 2 Drawing Sheets

(56) References Cited

U.S. PATENT DOCUMENTS

| | | | |
|---|---|---|---|
| 2007/0099479 | A1 | 5/2007 | Holterhoff et al. |
| 2012/0028513 | A1 | 2/2012 | Feye-Hohmann |
| 2017/0012368 | A1 | 1/2017 | Aboulkassem et al. |
| 2021/0057830 | A1 | 2/2021 | Fehling et al. |

FOREIGN PATENT DOCUMENTS

| | | | |
|---|---|---|---|
| DE | 202006009460 | U1 | 3/2007 |
| DE | 102008032837 | A1 | 1/2010 |
| DE | 202012103314 | U1 | 12/2013 |
| DE | 102017106720 | A1 | 10/2018 |
| DE | 202019101246 | U1 | 6/2019 |
| DE | 102020122135 | A1 | 3/2021 |
| DE | 102020123141 | A1 | 3/2021 |
| EP | 0336139 | A2 | 10/1993 |
| EP | 3116065 | A1 | 1/2017 |
| KR | 20180078239 | A | 7/2018 |
| WO | 2018178164 | A1 | 10/2018 |

* cited by examiner

CLAMPING SPRING-TYPE CONTACT DEVICE HAVING AN OVERSTRETCH PREVENTION MECHANISM, AND PLUG CONNECTOR INSERT HAVING AT LEAST ONE SUCH CLAMPING SPRING-TYPE CONTACT DEVICE

CROSS-REFERENCE TO RELATED APPLICATION

This application is a national stage application, filed under 35 U.S.C. § 371, of International Patent Application PCT/DE2022/100233, filed on Mar. 28, 2022, which claims the benefit of German Patent Application DE 10 2021 109 565.4, filed on Apr. 16, 2021.

TECHNICAL FIELD

The disclosure relates to a clamping spring-type contact device and to a plug connector insert having at least one clamping spring-type contact device.

BACKGROUND

Clamping spring-type contact devices are required in order to bring an electrical conductor, which is inserted therein in an insertion direction, into electrically conductive contact with a busbar of the clamping spring-type contact device and at the same time to hold the electrical conductor mechanically on the busbar, i.e. at least to prevent it from being pulled out counter to its insertion direction.

Said plug connector insert can be suitable for being fitted (i.e. inserted) directly into a plug connector housing, for example a grommet housing, add-on housing or socket housing. The plug connector insert, however, can also be a so-called “plug connector module” which is arranged (i.e. “inserted”) jointly with other plug connector modules as a constituent part of a plug connector modular system in a plug connector modular frame, wherein the plug connector modular frame can be fastened in a plug connector housing or to a wall leadthrough. Depending on the desired function, the other plug connector modules of the plug connector modular system can be assembled individually for the respective use, for example for optical and/or electrical analog and/or digital signal transmission, electrical energy transmission, transmission of gases and (pneumatic) pressure or even for the measurement of current, voltage, temperature and for evaluation and data processing purposes.

In the prior art, several types of clamping spring-type contact devices are disclosed, for example, in the publications DE 10 2005 028 063 B3, EP 0 336 139 B1, U.S. Pat. No. 8,251,738 B2 and U.S. Pat. No. 10,297,930 B2, in which a clamping spring pushes an electrical conductor against a busbar for the electrical contact thereof and clamps it against being pulled out on the connecting side. The clamping spring can be actuated for releasing the conductor from the busbar. In order to protect the clamping spring from overstretching when actuated, the clamping spring-type contact device has a stop for the clamping spring which can consist, for example, of a stamped-out and bent-back tab of the busbar or a separate, inserted stop body.

A drawback in this prior art is the manufacturing effort associated therewith. It has also been shown that, when actuated, the clamping spring is unnecessarily subjected to load by the stop, which can impair its function in the long term.

The German Patent and Trademark Office has researched the following prior art in the priority application for the present application: DE 10 2005 028 063 B3, DE 10 2008 032 837 A1, DE 10 2020 122 135 A1, DE 10 2020 123 141 A1, DE 202 05 821 U1, DE 20 2012 103 314 U1, U.S. Pat. No. 8,251,738 B2, U.S. Pat. No. 10,297,930 B2, EP 0 336 139 B1 and EP 3 116 065 A1.

SUMMARY

An object of the disclosure is to specify a clamping spring-type contact device having an overstretch prevention mechanism which can be manufactured as simply as possible. In particular, the overstretch prevention mechanism is not intended to subject the clamping spring to load when it is actuated by an actuator.

The object is achieved by the subject of the independent claims.

A clamping spring-type contact device has the following:

- a busbar for the electrical contact of an electrical conductor;
- a clamping spring held on the busbar for clamping and electrically connecting the electrical conductor to a contact region of the busbar in an unactuated state of the clamping spring;
- an actuator held indirectly or directly on the busbar for transferring the clamping spring from the unactuated state into an actuated state for releasing the electrical conductor; and
- an overstretch prevention mechanism for avoiding an overstretching of the clamping spring when actuated by the actuator, wherein according to the invention
- the overstretch prevention mechanism consists of the actuator striking against the busbar.

Advantageous embodiments of the invention are specified in the dependent claims and the following description.

The clamping spring-type contact device can be manufactured in an extremely simple manner.

The clamping spring-type contact device also has the advantage that, when actuated, the clamping spring is not pushed by the actuator against a stop and subjected to load and irreversibly deformed thereby in the long term.

Rather, the actuator is already limited in terms of its own movement by striking against the busbar. An overstretching of the clamping spring no longer takes place due to the actuator striking against the busbar, the spring force of the clamping spring naturally providing resistance to the actuator.

The manufacturing cost of the clamping spring-type contact device is reduced thereby, since a separate stop does not have to be provided for the clamping spring.

The situation is thus advantageously avoided that the clamping spring is irreversibly deformed by the mechanical pressure due to the actuator and the striking thereof against the busbar which takes place at the same time.

It is particularly advantageous if, in the actuated state, the clamping spring exerts a restoring force on the actuator. In particular, the clamping spring can have a protrusion which comes into contact with the actuator in the actuated position thereof, in order to increase the restoring force and thus to overcome potential static friction.

It is also particularly advantageous if the busbar forms a peripheral cage in which the clamping spring is at least partially arranged.

In particular, the busbar can be a stamped-bent part, which preferably is repeatedly bent back at right-angles and thus is shaped, in particular, to form the peripheral cage.

The clamping spring can be designed in one piece and, in particular, to be substantially V-shaped and have a clamping limb and a holding limb which are connected together via a spring bow. The clamping spring can be fastened by the holding limb to a first cage wall or at least supported thereon, in particular in a planar manner. The clamping spring can push against a second cage wall with the clamping limb or press and clamp the inserted electrical conductor thereagainst. The second cage wall can form the contact region of the busbar. In particular, the second cage wall can oppose the first cage wall. The aforementioned protrusion of the contact spring can be optionally arranged in the clamping limb.

The first cage wall can be connected to the second cage wall via at least one side wall. Preferably, the first cage wall is connected to the second cage wall by two side walls.

The actuator can have at least one stop edge. The busbar can have at least one counter-stop edge.

The actuator can strike against the busbar on at least one side wall of the cage. To this end, the side wall can have a counter-stop edge. When the cage has two side walls, one of the two side walls can have the stop edge. Preferably, however, both side walls can each have a counter-stop edge and the actuator can have two stop edges by which it strikes in each case against a counter-stop edge of one of the side walls.

At least one side wall can have a stepped portion, the stop edge of this side wall being formed thereby. In particular, both side walls can each have such a stepped portion. This has the advantage that, on the one hand, the guidance of the clamping limb over a sufficiently large spring path is ensured. On the other hand, the height of the stepped portion and thus the height of the stop edge, measured in the direction of movement of the actuator, can be selected independently thereof. The height of the stop edge can thus be selected such that an optimal compromise can be made between the permissible elastic deformation of the clamping spring for the purpose of introducing a correspondingly large electrical conductor, and preventing the aforementioned overstretching of the clamping spring in order to prevent the plastic deformation thereof. It is particularly advantageous that the clamping spring is not subjected to load by the stop.

In order to exert an optimal restoring force on the actuator, as already indicated, the clamping limb of the clamping spring can have the aforementioned protrusion which comes into contact with the actuator at the moment when the stop edge of the actuator strikes against the counter-stop edge of the side wall. The particularly large restoring force which the protrusion of the clamping limb exerts at this moment on the actuator serves to overcome the greater static friction of the actuator on—whatever type of—its guidance in the actuated state, in order to return it back into its unactuated position, while naturally the clamping spring which exerts the restoring force also returns to its unactuated state.

The aforementioned guidance of the actuator can at least partially be a constituent part of an insulating body in which the clamping spring-type contact device is received. Additionally, the actuator can also be guided by means of the busbar.

An arrangement of an insulating body and at least one clamping spring-type contact device inserted therein can preferably be a constituent part of a plug connector. In particular, it can be a plug connector insert with a plurality of clamping spring-type contact devices which are received in connecting chambers of a connecting region of the insulating body.

On the plug-in side, the insulating body can have a plug-in region with contact chambers in which plug-in contacts are arranged. Each contact chamber can be connected in each case to a connecting chamber arranged in the connecting region. Each plug-in contact can be electrically conductively connected and fastened in each case to a clamping spring-type contact device arranged in the respective connecting chamber, in particular riveted thereto. To this end, the busbar of the respective clamping spring-type contact device can have a connecting portion which is angled-back perpendicularly to the plug-in direction of the plug-in contact and which has a through-bore to which the plug-in contact is riveted or screwed.

As already mentioned in the introduction, the plug connector insert can be suitable for being fitted (i.e. "inserted") directly into a plug connector housing, for example a grommet housing, add-on housing or socket housing. The plug connector insert, however, can also be a plug connector module of the type mentioned in the introduction which is jointly arranged (i.e. "inserted") with other plug connector modules as a constituent part of a plug connector modular system in a plug connector modular frame, wherein the plug connector modular frame—hereinafter also denoted as the holding frame—can be fastened in a plug connector housing or on a wall leadthrough.

To this end, the insulating body of the plug connector module can optionally have latching lugs which engage in the installed state in latching windows of the holding frame for the fastening thereof. The insulating body can be designed to be substantially cuboidal. The latching lugs can then be arranged, in particular, on their opposing narrow sides. The latching lugs can differ in terms of their shape and, in particular, can be of variable width perpendicular to the plug-in direction. This serves for the polarization thereof, i.e. the correct alignment, inside the frame which then also has variable latching windows, in particular of variable width.

BRIEF DESCRIPTION OF THE DRAWINGS

An exemplary embodiment of the invention is shown in the drawings and is explained hereinafter in more detail. In the drawings.

DETAILED DESCRIPTION

The figures contain partially simplified schematic views. In some cases, identical reference signs are used for elements which are the same but possibly not identical. Different views of the same elements could be scaled differently.

Figure 1A:
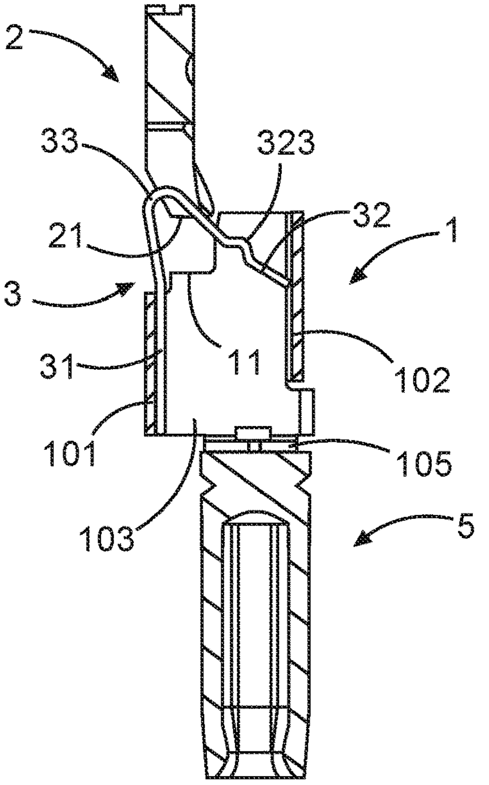
FIGS. 1*a-d* show a clamping spring-type contact device in a cross-sectional view in the unactuated state and in the actuated state, with and without an insulating body.
Figure 1B:
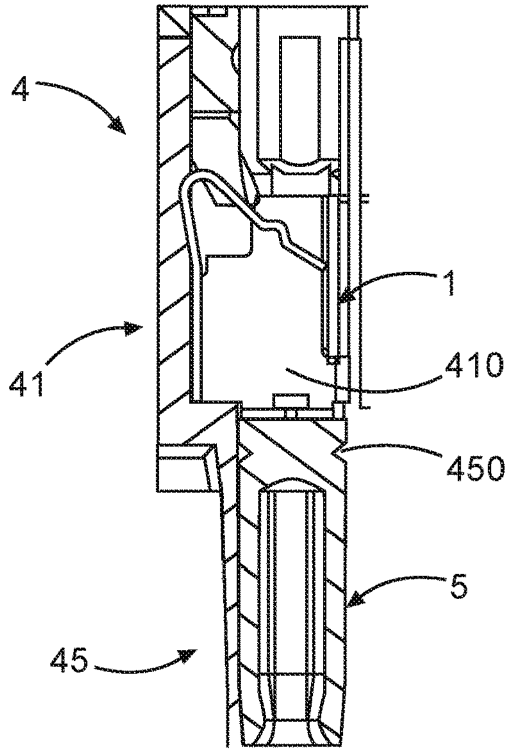

FIGS. 1*a* and 1*b* show a clamping spring-type contact device in cross section having an electrically conductive busbar 1 with a cage, a clamping spring 3 held thereon in its unactuated state, and an actuator 2 which is shown correspondingly thereto in its unactuated position. A plug-in contact 5 is shown on the plug-in side, i.e. at the bottom in the drawing, the plug-in contact being mechanically and electrically connected to the busbar 1 via a connecting portion 105 of the busbar 1. The plug-in contact 5, which is shown, is by way of example a socket contact. In a further embodiment, however, it can also be a different contact, for example a pin contact.

Figure 1C:
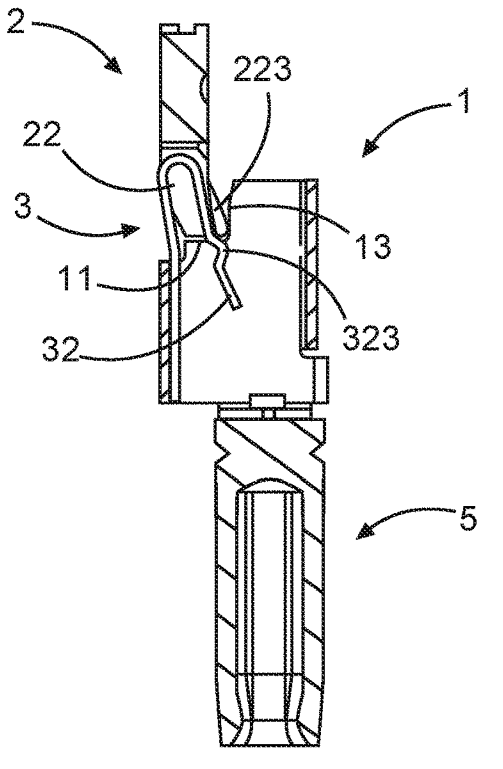
Figure 1D:
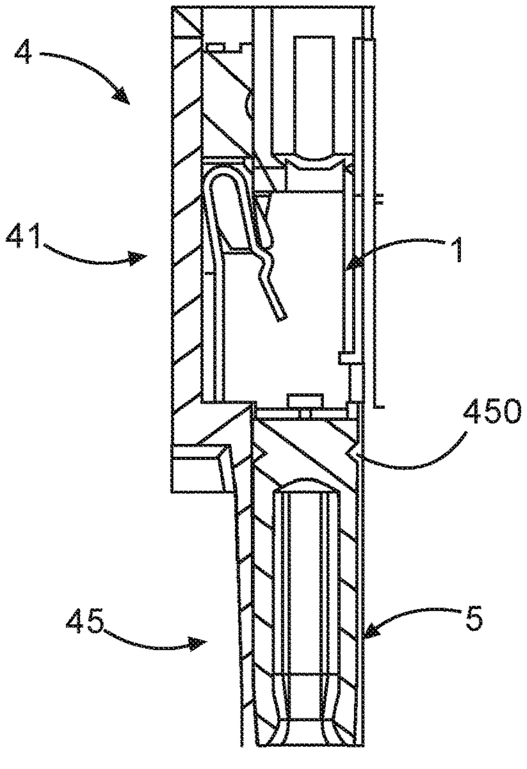

FIGS. 1*c* and 1*d* show in each case the same arrangement in which, however, the actuator 2 is in its actuated position and the clamping spring 3 is accordingly in its actuated state. The actuated state of the clamping spring 3 is characterized in that its clamping limb 32 is pivoted in the plug-in direction relative to its unactuated state.

It can be seen in FIGS. 1B and 1*d* that the actuator 2 is held by an insulating body 4, not shown in FIGS. 1*a* and 1*c* for reasons of clarity, and is arranged so as to be countersunk therein both in its unactuated position (FIG. 1B) and in its actuated position (FIG. 1*d*).

The insulating body 4 has a connecting region 41 with at least one connecting chamber 410 (only one shown here) and a plug-in region 45 which has at least one contact chamber 450 (only one shown here) which is connected to the respective connecting chamber 410. A clamping spring-type contact device of the aforementioned type is received in each connecting chamber 410. The plug-in contact 5 which is connected thereto is received in the contact chamber 450 of the plug-in region 45 so as to be connected to this connecting chamber 410.

The actuator 2 has two actuating arms 22 with in each case a stop edge 21 on the end side and a projection 223 connecting the actuating arms 22 on the end side for actuating the clamping limb 32 of the clamping spring 3.

It can be particularly clearly seen from a comparison of FIGS. 1*a* and 1*c* that, when actuated, (this takes place from top to bottom in the drawing) the actuator 2 slides with its projection 223 along a sliding edge 13 of the busbar 1 and in its actuated state (FIG. 1*c*) strikes with its stop edge 21 against a counter-stop edge 11 of the busbar 1.

As a result, the range of movement of the actuator 2 is limited in the plug-in direction, downwardly in the drawing. Thus the clamping spring 3 is not subjected to any overstretching when actuated by the actuator 2. Due to the length of the sliding edge 13 and the resulting position of the counter-stop edge 11, the maximum deformation of the clamping spring 3 can be set very accurately, so that when actuated the clamping spring 3 is exclusively subjected to a reversible elastic deformation by a suitable arrangement of the stop edge. The sliding edge 13 and the counter-stop edge jointly form a stepped portion in the respective side surface 103, 104 (see FIG. 2*b*).

The clamping spring 3 is designed to be substantially V-shaped. The clamping spring has a holding limb 31 and a clamping limb 32 which are connected together via a spring bow 33. The clamping spring 3 is supported with its holding limb 31 in a planar manner against a first cage wall 101. In further embodiments, the holding limb 31 can be additionally fastened, for example screwed, riveted or latched, to the first cage wall 101, or held on the busbar 1 at least in the plug-in direction (in the vertical direction in the drawing) by at least one holding aperture or holding recess of the holding limb 31 and a holding projection/a stamped-out holding tab, or the like, of the first side wall 101 engaging therein.

At the same time, the clamping spring 3 pushes with its clamping limb 32 against a second cage wall 102 which forms a contact region on the cage inner side. The second cage wall 102 opposes the first cage wall 101 and is connected thereto by two side walls 103, 104, only one thereof being able to be seen in this sectional view, namely from this view the rear side wall 103. The clamping spring 3 is in a pretensioned state in the cage even without the electrical conductor being inserted. This takes place—depending on the type of fastening of the holding limb 31 thereof—in such a manner that due to the pretensioning of the clamping spring 3 it is ensured that electrical conductors with arbitrarily small cross sections can be brought into contact by means of this contact spring-type device.

The clamping limb 32 has a protrusion 323 which comes into contact with the actuator 2, more specifically with the projection 233 of the actuator 2, in the actuated state thereof (see FIG. 1*c*). As a result, a particularly large restoring force can be applied from the clamping spring 3 onto the actuator 2 in its unactuated position. This is particularly advantageous for restoring the actuator 2 into its unactuated position. Finally, this particularly large restoring force assists with overcoming the static friction between the actuator 2, on the one hand, and the sliding edge 13 of the busbar 1 and/or the insulating body 4 in which the actuator 2 is held, on the other hand.

The cage of the busbar 1 is designed to be open on the connecting side, i.e. at the top in the drawing. As a result, not only the actuator 2 but also an electrical conductor, not shown in the drawing, for example a core of an electrical cable, can be inserted into the cage from the direction on the connecting side (coming from above in the drawing). The electrical conductor can be inserted between the contact limb 32 of the clamping spring 3 and the second cage wall 102 and clamped therein against being pulled out on the connecting side (at the top in the drawing). The second cage wall 102 forms on the inside an electrical contact region of the busbar 1 for the electrical conductor. The clamping spring 3 with its clamping limb 32 pushes the inserted electrical conductor against the contact region, i.e. from inside against the second cage wall 102 in order to connect it in an electrically conductive manner to the busbar 1, and thereby also to the respective plug-in contact 5.

Figure 2A:
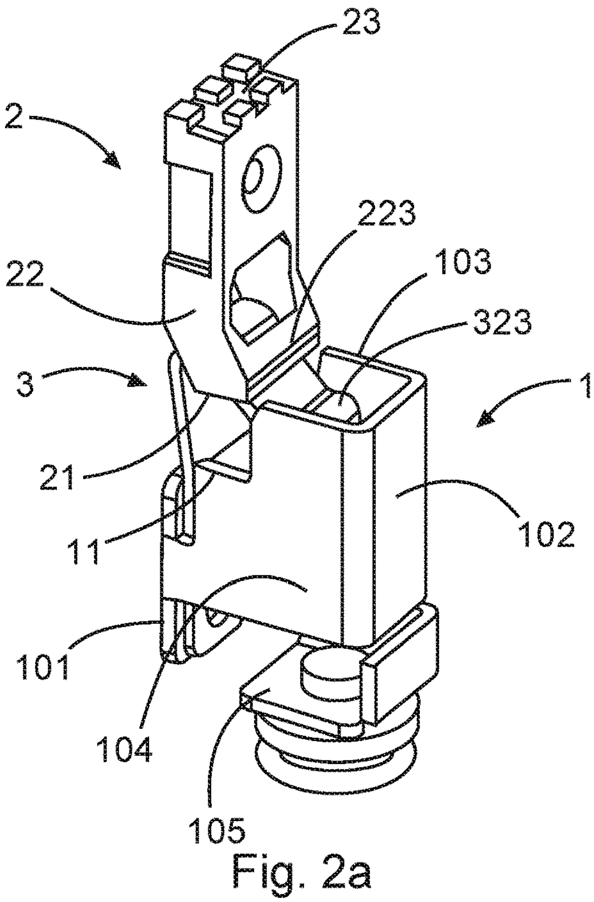
FIGS. 2*a, b* show the clamping spring-type contact device without the insulating body in the unactuated and in the actuated state, in a three-dimensional view.
Figure 2B:
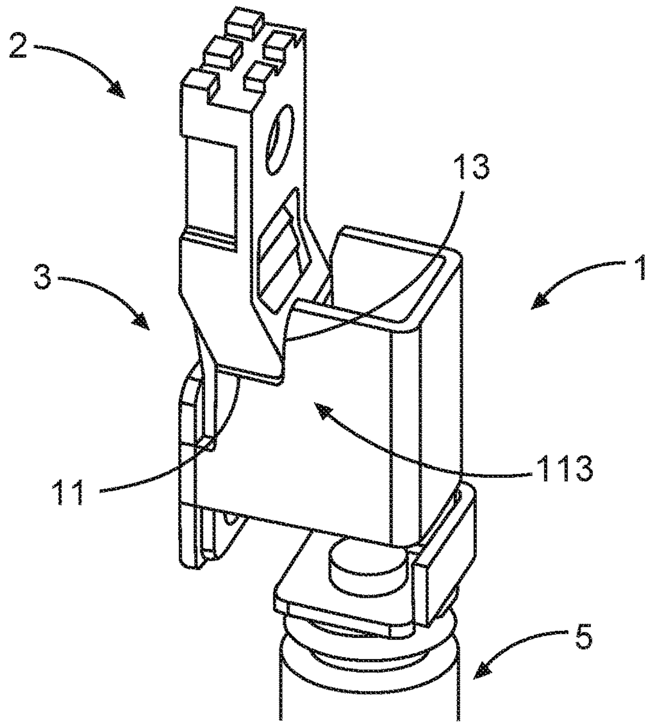

FIGS. 2*a* and 2*b* show the arrangement of FIGS. 1*a* and 1*c*, in each case in a three-dimensional view. The cage of the busbar 1 is designed over the periphery and has two side walls 103, 104 which connect together the first 101 and the second 102 cage wall. Each side wall 103, 104 has a stepped portion 113 with the sliding edge 13 running in the actuating direction (vertically in the drawing), along which the actuator slides with its projection 223 when actuated, and with the counter-stop edge 11 arranged at right-angles thereto, against which the actuator 2 strikes with its stop edge 21 in the actuated state thereof.

Opposite the stop edges 21 thereof (i.e. shown at the top in the drawing) the actuator 2 also has an actuating surface 23 with an actuating contour which is suitable for positioning a slotted screwdriver in order to be able to actuate in a simple manner the actuator 2 which is arranged so as to be countersunk in the insulating body 4.

While different aspects or features of the invention are shown in the figures, in each case in combination, it is clear to a person skilled in the art—unless specified otherwise—that the combinations shown and discussed are not the only possible combinations. In particular, mutually corresponding units or sets of features from different exemplary embodiments can be interchanged with one another.

LIST OF REFERENCE SIGNS

1 Busbar
101, 102 First, second cage wall
103, 104 Side walls
105 Connecting portion
11 Stop edge
113 Stepped portion 13 Sliding edge
2 Actuator
21 Stop edges
22 Actuating arms
223 Projection
23 Actuating surface
3 Clamping spring
31 Holding limb
32 Clamping limb
323 Protrusion
33 Spring bow
4 Insulating body
40 Connecting chamber
41 Connecting region
410 Connecting chamber
45 Plug-in region
450 Contact chamber
5 Plug-in contact

The invention claimed is:

1. A clamping spring-type contact device, comprising:

a busbar (1) for electrically contacting an electrical conductor;

a clamping spring (3) held on the busbar (1) for clamping and electrically connecting the electrical conductor to a contact region of the busbar (1) in an unactuated state of the clamping spring (3); and an actuator (2) comprising two actuating arms (22) connected by a projection (223), whereupon actuation of the actuator (2), the projection (223) moves a clamping limb (32) of the clamping spring (3) away from the contact region where at maximum deflection of the clamping limb (32), a spring bow (33) portion of the clamping spring (3) is positioned between the two actuating arms (22).

2. The clamping spring-type contact device as claimed in claim 1, wherein at least one actuator arm has a stop edge (21), and wherein the busbar has at least one counter-stop edge (11) which jointly form a stop in order to limit a range of movement of the actuator (2) in an actuating direction.

3. The clamping spring-type contact device as claimed in claim 1, wherein the clamping spring (3) has a protrusion (323) which comes into contact with the actuator (2) at the same time as the actuator (2) strikes against the busbar (1).

4. The clamping spring-type contact device as claimed in claim 1, wherein the busbar (1) forms a peripheral cage with a first cage wall (101) and a second cage wall (102) opposing the first cage wall (101), wherein the first cage wall (101) and the second cage wall (102) are connected together via two side walls (103, 104), wherein the second cage wall (103, 104) forms the contact region and wherein the clamping spring (3) is arranged at least partially inside the cage and is held on the first cage wall (101).

5. The clamping spring-type contact device as claimed in claim 4, wherein the clamping spring (3) is designed in one substantially V-shaped piece, and has a holding limb (31) and the clamping limb (32) which are connected together via the spring bow (33), wherein the clamping spring (3) is fastened by its holding limb (31) to the first cage wall (31) or is at least supported thereon in a planar manner and at the same time pushes directly or indirectly with its clamping limb (32) via the electrical conductor against the second cage wall (102).

6. The clamping spring-type contact device as claimed in claim 5, wherein the two side walls each have a stepped portion (113), wherein the shape of the stepped portion firstly prevents an overstretching of the clamping spring (3) and secondly permits a guidance of the actuator (2).

7. A plug connector insert, formed from at least one clamping spring-type contact device as claimed in claim 1 and an insulating body (4) with a connecting region (41) which has at least one connecting chamber (410), and a plug-in region (45) which opposes the connecting region (41) and has at least one contact chamber (450), wherein each contact chamber (450) is connected to a connecting chamber (410) and wherein a clamping spring-type contact device is received in each connecting chamber (410).

8. The plug connector insert as claimed in claim 7, wherein, when actuated, the actuator (2) is guided jointly by the insulating body (4) and the busbar (1).

9. The plug connector insert as claimed in claim 7, wherein, when the actuator (2) is actuated, the projection (223) cooperates with a clamping limb (32) of the clamping spring (3) and at the same time is guided on a sliding edge (13) of the busbar (1).

10. The plug connector insert as claimed in claim 7, wherein a plug-in contact (5) is arranged in each contact chamber (450), the plug-in contact being electrically conductively connected to the busbar (1) of the clamping spring-type contact device received in the respective connecting chamber (410).

11. The plug connector insert as claimed in claim 10, wherein the busbar (1) has a connecting portion (15) which is angled-back perpendicularly to a plug-in direction of the plug-in contact (5), the plug-in contact (5) being fastened thereto and being electrically conductively connected thereby to the busbar (1).

* * * * *